Jan. 12, 1937. W. S. SEARLES 2,067,419
OPHTHALMIC MOUNTING
Filed Nov. 20, 1934
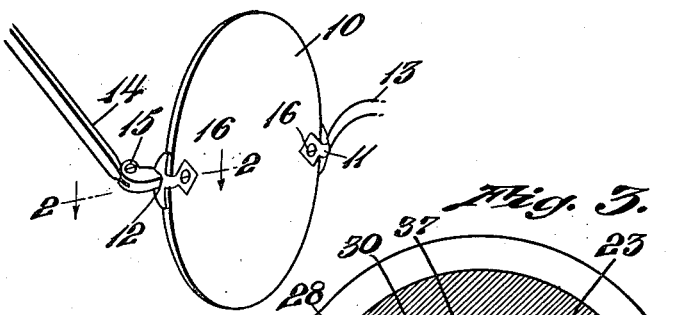
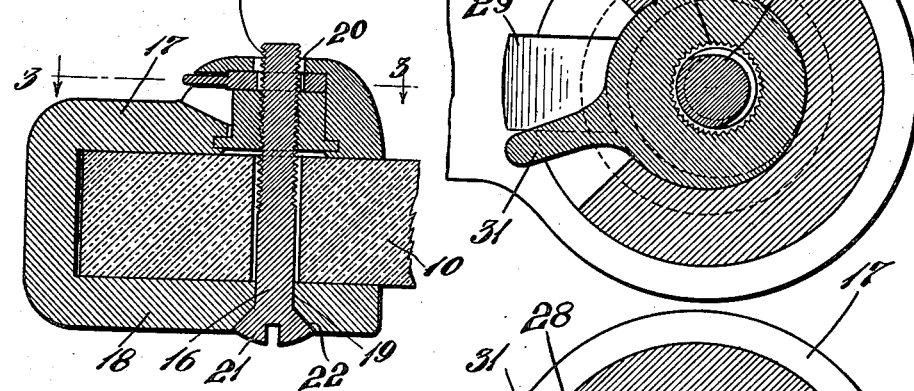
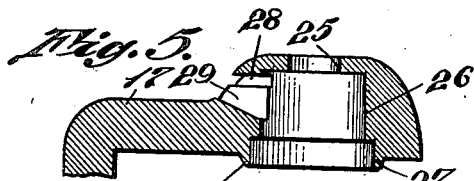
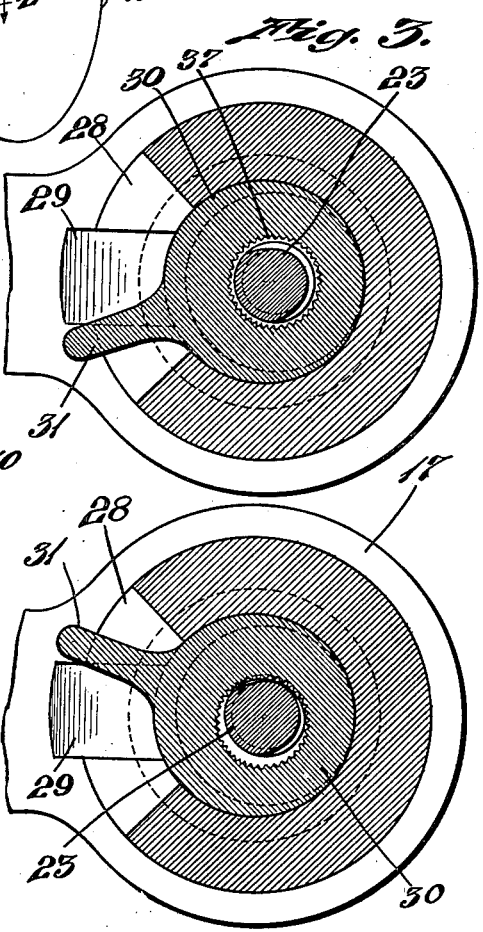
INVENTOR.
Wayne S. Searles
BY
Barlow & Barlow
ATTORNEYS.

Patented Jan. 12, 1937

2,067,419

UNITED STATES PATENT OFFICE 2,067,419

OPHTHALMIC MOUNTING

Wayne S. Searles, Providence, R. I., assignor to Universal Optical Corporation, Providence, R. I., a corporation of Rhode Island Application November 20, 1934, Serial No. 753,868

5 Claims. (Cl. 88—47)

This invention relates to an ophthalmic mounting, and has for one of its objects the locking of a fastening screw or pin securely in place against any loosening movement.

Another object of the invention is the provision of locking means which may be readily moved from locking position without detachment thereof to permit removal of the screw or pin from its attaching position.

Another object of the invention is the provision of an entirely mechanical locking means and one which is more effective in enabling the screw or pin to be moved to its desired position before being locked.

Another object of the invention is the provision of solderless means to secure an attaching pin in desired position against loosening.

Another object of the invention is the provision of means to exert lateral pressure upon the screw or pin to prevent it from axial or turning movement to a more loosened position.

Another object of the invention is the provision of a locking means which may be operated easily by a mere movement of a lever from one position to another.

Another object of the invention is the provision of a means to be completely housed except for its operating handle in the part in which it is mounted and thus one which will not interfere with the ornamental configuration thereof.

Another object of the invention is the provision of a locking means which will accommodate itself to varying diameters of screws or pins and by pressure force them into a position so that they will become tight as well as prevent their being axially moved or loosened.

Another object of the invention is the provision of a locking means which will be so constructed that the entire assembly may be easily accomplished.

With these and other objects in view, the invention consists of certain novel features of construction, as will be more fully described, and particularly pointed out in the appended claims.

In the accompanying drawing:

Fig. 1 is a perspective view of a lens showing several locations in which attaching pins or screws may be used with which my locking means may be associated;

Fig. 2 is an enlarged section on line 2—2 of Figure 1;

Fig. 3 is an enlarged section on line 3—3 of Figure 2;

Fig. 4 is a sectional view similar to Figure 3 showing a different position of the locking means;

Fig. 5 is a sectional view through one of the arms of the strap;

Fig. 6 is a sectional view of the locking member;

Fig. 7 is a sectional view through the bushing.

In the use of ophthalmic mountings there are many places where a pair of spaced arms are provided on one part which extend along the opposite sides of another part with a plain or thread pin extending through this assembly for holding these parts together. One instance of such relation of parts is the strap which is secured to the lens of a rimless mounting; and in order to hold a pin used in this relation whether it be threaded or not I have provided a rotating member with an eccentric opening to receive the pin and so that when turned the eccentricity of the opening will cause the walls thereof to move into engagement with the pin and exert a lateral pressure thereon sufficient to prevent it from moving out of its adjusted position. The lock is so arranged, however, that it may be readily so arranged that the opening through it registers with a bushing through which the attaching or securing pin also extends; and the following is a more detailed description of the present embodiment of this invention, illustrating the preferred means by which these advantageous results may be accomplished:

With reference to the drawing, 10 designates a lens which is provided with straps 11 and 12 for mounting respectively a bridge 13 and a temple 14 which is pivoted to the strap 12 by means of a pin 15 while the lenses are secured in position by a threaded pin 16. Thus in this particular view I have illustrated three different locations for an attaching pin or screw, and in connection with each of which I may employ my locking means for holding the same from any loosening movement. I have, however, illustrated a strap 12 for a more detailed showing of the invention.

This strap 12 is provided with a pair of arms 17 and 18 which have aligned openings therein 19 and 20 for the reception of the screw 16 which has a head 21 in the countersunk portion 22 of the opening 19, while its opposite threaded end 23 engages with a threaded bushing in the arm 17, as will be more fully described.

The arm 17 is provided with a plurality of different sized bores designated 25, 26 and 27. The locking member consists of a disc 30 with a handle 31 extending laterally therefrom and is rotatably mounted in bore 26, while it is provided with an eccentric opening 32 which in one position of rotation will be centrally aligned with bore 25 for the reception of the screw. A slot is provided at 28 extending laterally from the bore 26 and through which the handle 31 of the lever manipulating the locking member extends. The slot is also extended downwardly as at 29 to enable assembly of the bushing with the handle thereon.

A threaded bushing is designated generally 33 and is provided with an eccentric flange 34 which is received within the bore 27, while the raised stock 35 about the bore 27 is turned over to secure the bushing in the opening. This bushing when it is forced in place has its flange abut against the shoulder formed between the bores 26 and 27 so that no pressure is brought to bear upon the locking member, thus leaving the lock free to rotate in the space between the end of the bushing and the shoulder between the bores 25 and 26.

A threaded opening 36 in the bushing aligns with the bore 25 and when the locking member 30 is in one position such as illustrated in Figure 3, a pin or screw may be inserted through the arms 17 and 18 to draw them together sufficiently tight on the lens 10 to firmly hold the same in position. After the desired degree of pressure has been secured, the handle 31 of the locking member is moved from the position shown in Figure 3 to the position shown in Figure 4, and the eccentric opening 32 through this locking member causes one side of it to move firmly into engagement with and tend to crowd the screw laterally so that a high degree of lateral pressure is exerted. This locking member by means of its corrugation 37 extending axially thereof bites into the screw and holds it securely in position. Thus the screw is prevented from any loosening movement or there be merely a pin, this pin is so firmly crowded laterally in position that it cannot move so as to in any way loosen or move from its adjusted securing position extending between the arms and holding the lens or other part which may be located between a similar pair of arms in position.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a securing pin and a socket through which it extends, said socket being provided with a slot, a rotatable locking member in said socket provided with a pin receiving opening eccentric to its axis of rotation, and a handle on said member extending out through said slot.

2. In an ophthalmic mounting, a securing pin and a socket through which it extends, said socket being provided with a slot, a rotatable locking member in said socket provided with a pin receiving opening eccentric to its axis of rotation, a bushing in said socket with a pin receiving opening on the axis of rotation of said member, and means extending through said slot for moving said member.

3. In an ophthalmic mounting, a securing pin and a socket through which it extends, said socket being provided with a slot, a rotatable locking member in said socket provided with a pin receiving opening eccentric to its axis of rotation, and a handle on said member extending out through said slot, said locking member being roughened on its inner surface.

4. In an ophthalmic mounting, a securing pin and a socket through which it extends, said socket being substantially entirely closed on one side, a threaded bushing fixed in said socket having threaded engagement with said pin, and a relatively thin locking member in said socket having an opening the walls of which embrace the pin and which is adapted to rotate relatively to the pin about an axis eccentric to the axis of said opening said walls bearing laterally against the pin in one position to lock the pin, said socket having a slot extending transversely of the pin to provide for the rotation of said locking member.

5. In an ophthalmic mounting, a socket closed at one end, a threaded bushing fixed in said socket so as to close the other end thereof, a pin having threaded engagement with said bushing, and a locking member between said bushing and the wall of the socket at the closed end thereof and having an opening the walls of which are eccentric to the axis of said pin and embrace the pin, said member being rotatable relative to the pin and about an axis extending parallel to the axis of the pin and eccentric to the axis of said opening to lock the pin in one position on the member, said socket having a transverse slot in the zone of said locking member.

WAYNE S. SEARLES.